United States Patent

[11] 3,575,199

| [72] | Inventor | Henry C. Beattie<br>Marine City, Mich. |
|---|---|---|
| [21] | Appl. No. | 773,066 |
| [22] | Filed | Nov. 4, 1968 |
| [45] | Patented | Apr. 20, 1971 |
| [73] | Assignee | Reef-Baker Corporation<br>East Detroit, Mich.<br>Continuation-in-part of application Ser. No.<br>753,663, Aug. 19, 1968, now abandoned. |

[54] AUTOMATIC CONDENSATE VALVE
4 Claims, 2 Drawing Figs.

[52] U.S. Cl. ................................................. 137/341,
137/203, 137/624.13, 251/129
[51] Int. Cl. .................................................. F16k 49/00,
F16k 31/06
[50] Field of Search ..................................... 251/129;
137/624.13, 624.11, 341, 203, 204

[56] References Cited
UNITED STATES PATENTS

| 1,985,314 | 12/1934 | Coleman | 137/624.13X |
| 2,007,358 | 7/1935 | Anger | 137/341X |
| 2,564,873 | 8/1951 | Wright | 137/341X |
| 3,168,899 | 2/1965 | Mellett | 137/341 |

FOREIGN PATENTS

| 200,483 | 4/1924 | Great Britain | 251/129 |
| 559,478 | 9/1923 | France | 251/129 |

*Primary Examiner*—Arnold Rosenthal
*Attorney*—Whittemore, Hulbert and Belknap

ABSTRACT: The automatic condensate valve includes a housing having a chamber for the accumulation of liquid, and a valve member normally closing an outlet from the chamber. Electromagnetic means are provided including an actuator for opening the valve member at predetermined intervals of time.

INVENTOR
HENRY C. BEATTIE

BY *Whittemore, Hulbert & Belknap*

ATTORNEYS

AUTOMATIC CONDENSATE VALVE

This application is a continuation-in-part of my copending application Ser. No. 753,663, filed Aug. 19, 1968, and now abandoned.

SUMMARY OF THE INVENTION

One object of this invention is to provide an improved condensate valve which is operated at predetermined timed intervals.

Another object of the invention is to provide a condensate valve which is positive in its operation and capable of relieving the accumulated liquid from the chamber rapidly.

Another object is to provide electromagnetic means including a valve actuator movable into contact with the valve upon energization of the electromagnetic means to shift the valve member to open position and drain the accumulation of liquid in the chamber.

Other objects and features of the invention will become apparent as the description proceeds, especially when taken in conjunction with the accompanying drawing, wherein.

Figure 1:
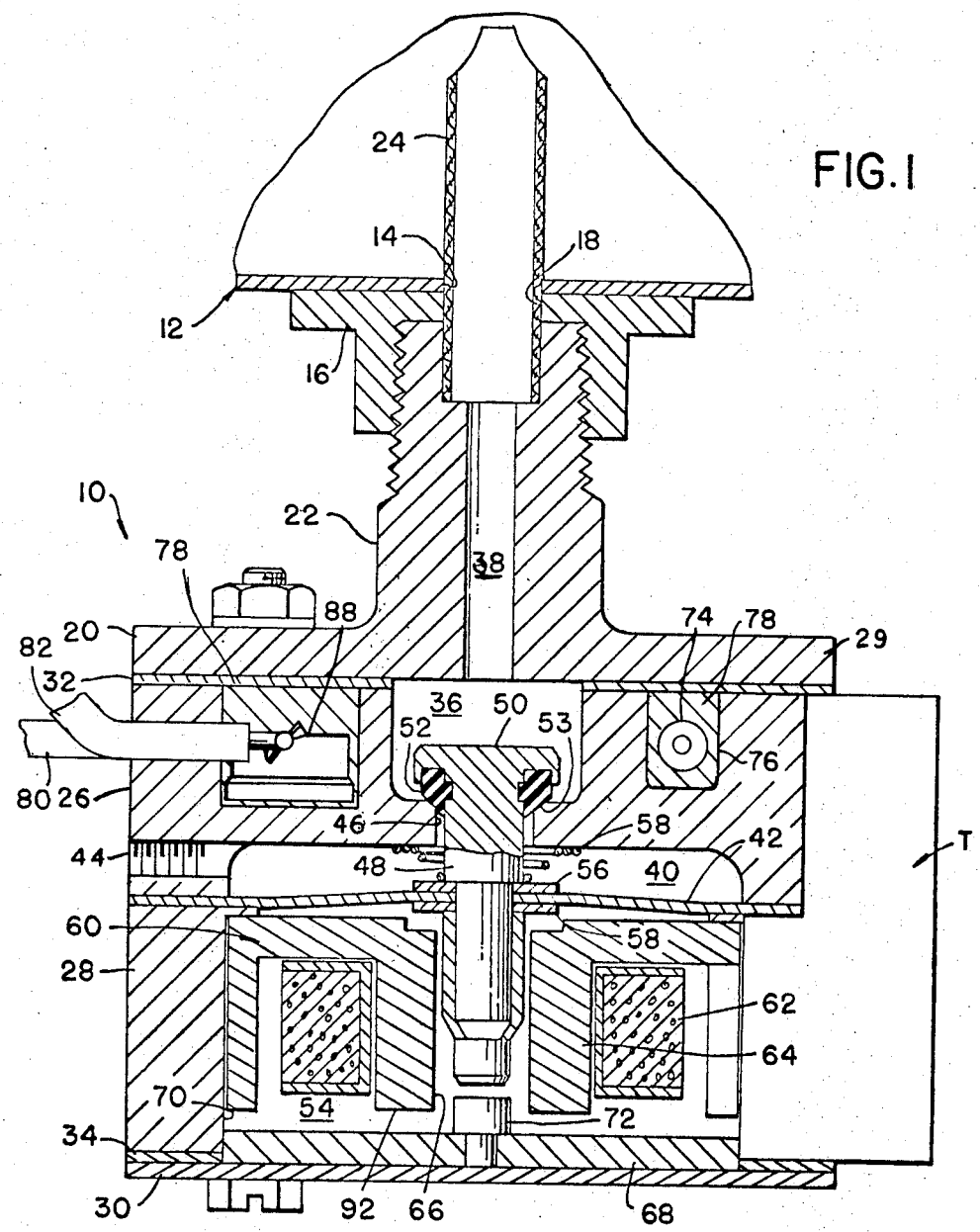
FIG. 1 is a central vertical sectional view of the condensate valve of my invention shown connected to an air or gas supply tank.

Referring now more particularly to the drawing, the condensate or drain valve in FIG. 1 is shown connected to an air or gas supply tank to remove condensate therefrom. While the valve is illustrated in connection with a supply tank such as may be used in vehicles having compressed air for operating the brakes of a vehicle, for example, it should be understood that the valve is useful in connection with other types of tanks and for other purposes whether or not a tank contains air or gas and whether or not the pressure is maintained above atmospheric pressure.

With particular reference to FIG. 1, the condensate valve is generally designated 10 and is connected to the tank 12 adapted to contain a supply of air or gas to be used for diversified purposes, which supply of air or gas is preferably under a pressure above atmospheric pressure. The valve is shown as being screw-threaded into an opening in the bottom of the tank. Specifically, the bottom wall of the tank has an opening 14 over which is secured the internally threaded member 16 having an aperture 18 in alignment with the aperture 14. The cap 20 of the condensate valve 10 has a vertically upwardly extending tubular stem 22 which is threaded into the member 16. A tubular screen 24 extends from a counterbore in the stem 22 upwardly through the openings 14 and 18 into the tank 12. The screen 24 is provided to prevent solids and other impurities from entering the drain valve.

The condensate valve 10 as already stated has a cap 20, and also has an upper body 26, a lower body 28 and a bottom plate 30. Essentially the cap 20, upper and lower bodies 26 and 28, and bottom plate 30 make up the housing of the valve. Sealing gaskets 32 and 34 are provided respectively between the cap 20 and upper body 26, and between the lower body 28 and bottom plate 30.

A liquid accumulation chamber 36 is formed centrally in the upper body 26, the upper surface of which is defined by the lower surface of the plate portion 29 of the cap 20. The vertical passage 38 in the stem 22 of cap 20 provides direct communication from the interior of tank 12 to the chamber 36.

The lower portion of the upper body 26 is formed to provide a central chamber 40, the lower surface of which is defined by a flexible diaphragm 42 which is clamped between the upper and lower body portions 26 and 28 of the housing. There is an outlet port 44 from chamber 40 to the atmosphere.

A vertical passage 46 extends from liquid accumulation chamber 36 to chamber 40 which however is normally closed by the valve member 48. Valve member 48 is in the form of a vertically extending elongated pin which is of reduced diameter relative to the outlet passage 46 to provide an annular space for the outflow of liquid from chamber 36 when the valve member 48 is in its upper open position. FIG. 1 illustrates the valve member 48 in its lower closed position. The valve member 48 has an enlarged head 50 at the upper end within chamber 36, and an annular sealing ring 52 of rubber or like material surrounds the valve member 48 beneath the head and is adapted to engage the valve seat 53 at the upper end of outlet passage 46 and close the same in the lower position of the valve member shown in FIG. 1.

The valve member 48 extends downwardly through the diaphragm 42 into the enlarged space or chamber 54 provided in the lower body 28. Washers 56 and 58 seal the passage through diaphragm 42 occupied by the valve member, and a compression spring 58 surrounding the valve member bears against the upper wall of chamber 40 and against washer 56 to urge the valve member in a downward direction to its normally closed position shown in FIG. 1.

An electromagnet 60 is disposed within the space 54 in the lower body and comprises a coil 62 and a center 64 providing a vertical passage 66 into which the lower end of the valve member 48 extends. The electromagnet also includes the armature 68 which is a plate normally resting upon the bottom plate 30 in space 54 but which is capable of moving vertically upwardly in response to energization of the electromagnet. The annular sidewall 70 of space 54 guides the free vertical movement of armature 68. The armature carries a central valve actuator 72 in the form of a vertically upwardly extending pin which is spaced beneath the lower end of the valve member when the armature 68 is in its lower deenergized position and the valve member is in its lower closed position as shown in FIG. 1.

Heating elements 74 are disposed in an annular space 76 in the upper body 26, being substantially surrounded by the insulating material 78. External wires 80 and 82 are connected to the heating elements 74 and thermostat 88. The heating elements 74 are provided to heat the condensate valve when necessary and thus to prevent the formation of ice in the chamber 36. The thermostat 88 is incorporated in the valve to close the circuit to the heating elements 74, when the temperature of the valve unit drops below a predetermined temperature to energize the heating elements 74 and prevent the formation of ice from the condensate in the valve. Thus for example the thermostat 88 may operate to automatically close the circuit to the heating elements 74 when the temperature drops to about 32° F. The thermostat 88 is designed to open the circuit to the heating elements 74 and deenergize the same when the temperature of the valve unit rises above a certain predetermined value safely above the temperature at which ice will form from the condensate in the valve.

Figure 2:
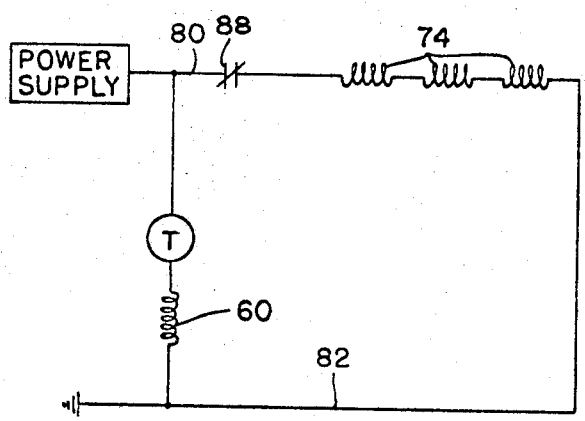
FIG. 2 is an electrical diagram.

It will also be noted in FIG. 2 that the electromagnet 60 is connected to the power supply through the timer T which may be a solid state timer and is a part of the electrical unit secured to the side of the condensate valve housing. The timer T is provided to energize the electromagnet 60 at predetermined intervals of time.

In use, the parts of the condensate valve will normally occupy the positions shown in FIG. 1, permitting the accumulation of liquid condensate from the tank 12 in the chamber 36. At predetermined intervals of time, as determined by the timer T, electromagnet 60 is energized causing the armature 68 to be picked up or lifted into contact with the lower annular end surface 92 of the center 64 of the electromagnet. During this movement, the actuator 72 engages the lower end of the valve member 48 lifting the seal 52 off seat 53 and thereby opening the outlet passage 46. The accumulated liquid in chamber 36 is permitted to drain into chamber 40 and to be exhausted through port 44 to the atmosphere or to any line connection that may be connected to port 44. If there is pressure above atmosphere in the tank 12, this pressure will serve to blow out the accumulated liquid in chamber 36.

The timer is preferably such that it energizes the electromagnet for only a brief period of time, sufficient to blow off the accumulated liquid in chamber 36 but not long enough to appreciably dissipate the pressure in the tank. The intervals between the periods of electromagnet energization are selected based on experience to remove the accumulated condensate.

I claim:

1. A condensate valve comprising a housing, a liquid chamber in the upper portion of said housing for the accumulation of liquid, a liquid inlet to said liquid chamber, a second chamber in said housing beneath said liquid chamber having a port opening through said housing to the atmosphere, a flexible diaphragm defining the bottom wall of said second chamber, an outlet passage extending downward from said liquid chamber to said second chamber, an elongated upright valve member vertically reciprocable in said outlet passage and being of reduced diameter relative to the latter to allow liquid to pass from said liquid chamber to said second chamber when said valve member is in its upper open position, said valve member having a head at the upper end disposed in said liquid chamber and provided with an annular seal adapted to seal said outlet against the passage of liquid from said liquid chamber upon movement of said valve member to its lower closed position, spring means urging said valve member downwardly to its lower position, a third chamber in said housing beneath said second chamber, said valve member extending downwardly through said diaphragm in sealed relation therewith and terminating at its lower end in said third chamber, electromagnetic means in said third chamber including a vertically movable armature having a valve actuator normally spaced beneath the lower end of said valve member, said armature being movable upwardly in response to energization of said electromagnetic means to cause said actuator to contact the lower end of said valve member and lift the same to its open position, and timer operated means for automatically energizing said electromagnetic means at predetermined intervals.

2. The condensate valve defined in claim 1, wherein said armature is a horizontal plate guided by the sidewalls of said third chamber for vertical movement, and said actuator is a pin carried by and extending vertically upward from said armature.

3. The condensate valve defined in claim 2, wherein heating means are provided to prevent the formation of ice in said liquid chamber, and thermostat means are provided to energize said heating means in response to a drop in temperature of said valve below a predetermined value and to deenergize said heating means in response to a rise in temperature of said valve above a higher predetermined value.

4. A condensate valve comprising a housing, a liquid chamber in the upper portion of said housing for the accumulation of liquid, a liquid inlet to said liquid chamber, a second chamber in said housing beneath said liquid chamber having a discharge port opening through said housing, a flexible diaphragm defining the bottom wall of said second chamber, an outlet passage extending downward from said liquid chamber to said second chamber, an elongated upright valve member vertically reciprocable in said outlet passage and being of reduced diameter relative to the latter to allow liquid to pass from said liquid chamber to said second chamber when said valve member is in its upper open position, said valve member having a head at the upper end disposed in said liquid chamber and provided with an annular seal adapted to seal said outlet against the passage of liquid from said liquid chamber upon movement of said valve member to its lower closed position, spring means urging said valve member downwardly to its lower position, a third chamber in said housing beneath said second chamber, said valve member extending downwardly through said diaphragm in sealed relation therewith and terminating at its lower end in said third chamber, electromagnetic means in said third chamber operative when energized to lift said valve member to its open position, and means for energizing said electromagnetic means.